United States Patent [19]

Farr

[11] 4,340,258
[45] Jul. 20, 1982

[54] HYDRAULIC ANTI-SKID BRAKING SYSTEMS FOR VEHICLES

[75] Inventor: Glyn P. R. Farr, Warwickshire, England

[73] Assignee: Lucas Industries Limited, Birmingham, England

[21] Appl. No.: 208,642

[22] Filed: Nov. 20, 1980

Related U.S. Application Data

[63] Continuation of Ser. No. 67,936, Aug. 20, 1979, abandoned.

[30] Foreign Application Priority Data

Aug. 18, 1978 [GB] United Kingdom ............... 33788/78

[51] Int. Cl.³ .............................................. B60T 8/02
[52] U.S. Cl. .................................... 303/115; 303/116
[58] Field of Search .................. 303/115, 10, 116, 117, 303/119, 6 R, 113, 114, 118, 61–63, 68–69, 11–12, 92, 93, 102, 24; 188/181 A

[56] References Cited

U.S. PATENT DOCUMENTS

| | | | |
|---|---|---|---|
| 3,724,914 | 4/1973 | Skoyles | 303/116 |
| 3,922,021 | 11/1975 | Every | 303/116 |
| 3,980,346 | 9/1976 | Leiber | 303/6 R |
| 4,046,427 | 9/1977 | Baynes et al. | 303/116 X |

*Primary Examiner*—Douglas C. Butler
*Attorney, Agent, or Firm*—Scrivener, Clarke, Scrivener & Johnson

[57] ABSTRACT

An hydraulic anti-skid braking system for vehicles is disclosed in which a supply of operating fluid from a master cylinder to a vehicle brake is modulated by a modulator assembly in accordance with signals from a skid sensing device. The modulator assembly incorporates an expansion chamber and an hydraulic pump has a working chamber which is connected to the expansion chamber. A dump valve disposed between the expansion chamber and a reservoir for fluid is operable by the sensing device to regulate the pressure in the expansion chamber in accordance with the deceleration of the wheel braked by the brake. The pump is operable only to repressurize the expansion chamber following correction of a skid.

24 Claims, 9 Drawing Figures

HYDRAULIC ANTI-SKID BRAKING SYSTEMS FOR VEHICLES

SPECIFIC DESCRIPTION

This application is a continuation of application Ser. No. 067,936, filed Aug. 20, 1979, now abandoned.

This invention relates to hydraulic anti-skid braking systems for vehicles of the kind in which the supply of operating fluid from a supply to a vehicle brake is modulated by a modulator assembly in accordance with skid signals from skid sensing means.

In some known anti-skid systems of the kind set forth the sensing means is constructed to energise a solenoid-operated valve which controls the application of a control pressure from a power supply to operate the modulator valve assembly. These systems generally have separate supplies to apply the brakes and some incorporate an accumulator to re-apply the brakes when the pressure falls below a predetermined value. These known systems are relatively complicated and expensive, and are only practical for use on commercial or luxury vehicles.

According to our invention in an hydraulic anti-skid system of the kind set forth the modulator assembly incorporates an expansion chamber, and an hydraulic pump incorporating a plunger working in a bore has a working chamber which is connected to the expansion chamber, and a dump valve is disposed between the expansion chamber and a reservoir for fluid, the dump valve being movable by the skid sensing means between a normally closed position in which the expansion chamber is pressurised so that the modulator assembly is held in a first position permitting operating fluid to be supplied to the brake and an open position when the skid signal exceeds a predetermined value whereby the pressure in the expansion chamber is reduced so that the modulator assembly can move into a second position to cut-off communication between the supply and the brake and subsequently reduce the pressure of fluid supplied to the brake, the pump being operable only to re-pressurise the expansion chamber following correction of a skid.

This is achieved by the provision of disabler means for preventing the plunger from engaging with a drive until the dump valve has opened.

Arranging for the pump to be inoperable and in consequence for no pumping of fluid to take place unless automatic re-application of the brake following a skid is required has the advantage that brake fluid can be utilised (as opposed to conventional hydraulic fluid of the mineral type) whilst avoiding the degradation of the properties of brake fluid which would result if it were circulated continuously.

The pump may be driven from the wheel through the drive and the skid sensing means may also be driven by the wheel. This provides a compact assembly.

The pump plunger may be of differential outline adapted to work in a stepped bore with the end of greater area being exposed to the operating fluid and the end of smaller area being engageable with the drive. In such a construction the disabler means comprise a spring for urging the smaller end of the plunger away from the drive in combination with the pressure in the working chamber which is generated by the operating pressure and which acts over an area of the plunger equal to the difference between opposite ends of the plunger.

The expansion chamber may be defined within a bore by an expander piston which, during normal brake application, is urged by the pressure in the chamber into an operative position to hold open a valve so that the operating fluid can be supplied to the brake and can act on the opposite outer end of the expander piston to bias the expander piston in an opposite brake pressure relieving retracted direction upon reduction of pressure in the expansion chamber, initially to permit the valve to close and thereafter to relieve the pressure applied to the brake.

In a modification the modulator assembly comprises a sensing piston of differential outline which is coupled at its end of smaller area to the plunger, through a lost-motion connection, the plunger being of constant area throughout its length. In such a construction the disabler means comprises a spring for urging the sensing piston away from the drive for the pump, and the lost-motion connection is operative to withdraw the plunger from the drive.

The skid sensing means may be of any convenient construction. For example, it may comprise a flywheel mechanism driven from the wheel and incorporating a lever for operating the dump valve. Alternatively it may comprise an electronic speed sensor driven by the wheel and for producing a signal which is fed into a control module which, in turn, provides a current for energising a solenoid for controlling the dump valve.

Some embodiments of our invention are illustrated in the accompanying drawings in which.

Figure 1:
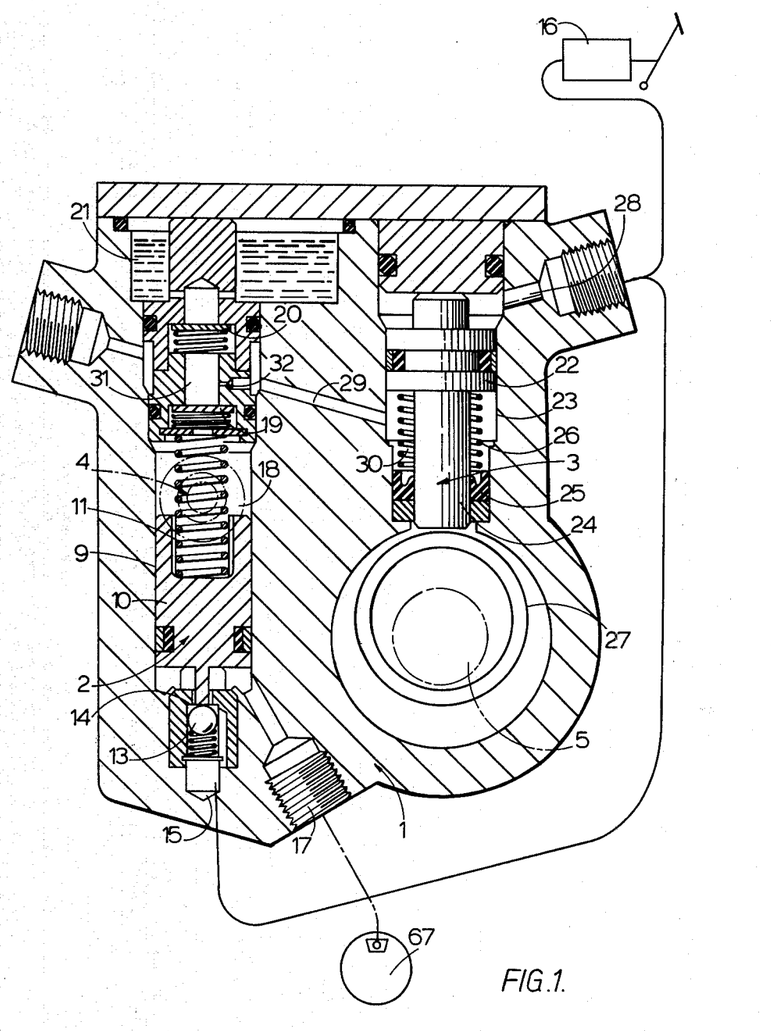
FIG. 1 is a transverse section through a combined modulator and skid sensing assembly for an hydraulic anti-skid braking system.
Figure 2:
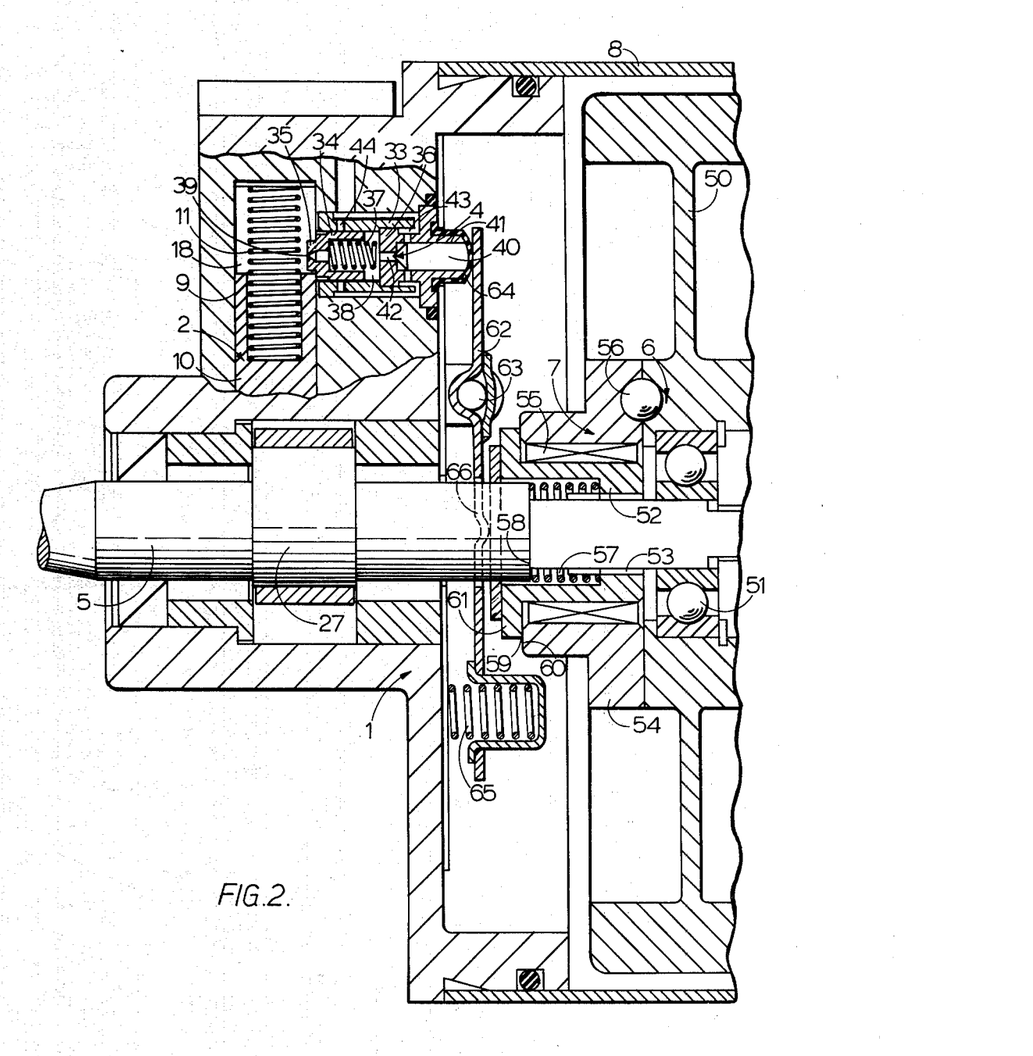
FIG. 2 is a longitudinal section through the assembly in a plane normal to the plane of FIG. 1.

The assembly illustrated in FIGS. 1 and 2 comprises a housing 1 incorporating a modulator assembly 2, an hydraulic pump 3 and a pressure dump valve 4. A longitudinally extending shaft 5 projecting at opposite ends from the housing 1 is coupled at one end to the wheel and at the other end carries skid sensing means 6 in the form of a flywheel assembly 7 which can be enclosed within a cylindrical guard 8 carried from the adjacent end of the housing 1.

The modulator assembly 2 comprises a bore 9 in which works a piston 10 which is normally urged into an operative position by a light spring 11. In this position the piston 10 urges a spring loaded ball 13 away from a seating 14 to place an inlet port 15 for connection to an hydraulic master cylinder 16 in communication with an outlet port 17. An expansion chamber 18 is defined within the bore 9 between the piston 10 and a pair of spaced spring-loaded one-way valves 19 and 20 which are biassed in corresponding directions to prevent fluid in the chamber 18 from flowing back into a reservoir 21 which is located in the housing 1 above the one-way valve 20.

The pump 3 comprises a plunger in the form of a piston 22 working in a bore 23 in the housing 1 in a position parallel to the bore 9. The piston 22 is carried by a rod 24 which works through a seal 25 at one end of the bore 23. A spring 26 surrounding the rod 24 urges the piston 22 towards the end of the bore 23 which is remote from the seal 25 to hold the free end of the rod 24 out of engagement with an eccentric cam 27 on the shaft 5. The end face of the piston 22 which is of greater area is exposed to pressure in the master cylinder 16 through a second inlet port 28 and an inclined drilling 29 connects a working chamber 30 between the piston 22 and the seal 25 with a space 31 between the two one-way valves 19 and 20, through a restricted orifice 32.

The dump valve 4 comprises a cylindrical body 33 which extends from the end of the housing 1, which is adjacent to the fly wheel mechanism 7, transversely into the expansion chamber 18. A first cup-shaped valve member 34 including an end portion 35 of reduced diameter which projects in the chamber 18 is urged away from a seat 36 at an intermediate point in the length of the body 33 by means of a spring 37. The expansion chamber 18 is connected to a chamber 38 between the valve member 34 and the seat 36 and in which the spring 37 is housed, through a restricted orifice 39 in the valve member 34. In this position the valve member 34 closes radial ports 44 in the body 33, which lead to the reservoir 21, to cut-off communication between the chamber 18 and the reservoir 21. Also a second valve member 40 comprising a rod working in a bore 41 and projecting from the housing 1 closes a passage 42 in the seating 36 to cut-off communication through the passage 42 with the reservoir 21 through further radial ports 43.

The flywheel assembly 7 comprises a flywheel 50 which is freely rotatable on a bearing 51 at one end of the shaft 5. The flywheel 50 is driven from the shaft 5 through a collar 52 which is keyed to the shaft 5 for relative axial sliding movement through splines 53. A pressure plate 54 surrounds, and is driven by, the collar 52 through a one-way drive 55, and balls 56 are located in complementary recesses in mating faces of the pressure plate 54 and the flywheel 50. The mating faces are urged towards each other by means of a spring 57 which acts between the collar 52 and a shoulder 58 on the shaft 5 to determine the threshold setting of the skid sensing means. A face clutch 59 is defined by an engagement between an end face 60 of the pressure plate 54 and a radial flange 61 on the collar 52.

A lever 62 is mounted to rock about a fulcrum 63 on the end of the housing 1 which is adjacent to the flywheel 50. One end of the lever 62 acts on the free end of the second valve member 40 of the dump valve 4 through a sealing boot 64. The other end of the lever 62 is urged away from the housing 1 by a spring 65. Finally, at a point between the fulcrum 63 and the spring 65, the lever 62 acts on the collar 52 through two domed contact points 66 on opposite sides of the shaft 5.

When the wheel is rotating in a brakes off condition, the spring 26 holds the rod 24 out of engagement with the cam 27 so that the pump 3 is disabled. The flywheel 50 is driven by, and at the same speed as, the shaft 5, through the one-way drive 55, the balls 56 and the recesses in which they are located. The spring 65 pivots the lever 62 in a direction to hold the dump valve 4 closed with the reduced diameter portion 35 projecting into the bore 9 to act as a stop and prevent accidental movement of the piston 10 through a distance sufficient to permit the ball 13 to engage with the seating 14.

During normal braking, fluid from the master cylinder 16 is supplied to the inlet 15 and then to a brake 67 from the outlet port 17, since the ball 13 is held away from the seating 14. Also pressure from the master cylinder 16 is applied, through the second inlet port 28, to the full area of the piston 22. The pressure from the master cylinder 16 acts through the piston 22 to develop a higher pressure in the working chamber 30, due to the difference in areas, and the higher pressure is supplied to the expansion chamber 18 through the restrictor 32 and the one-way valve 19. This ensures that the expander piston 10 is held in a first position in which it holds the ball 13 away from the seating 14. Because the dump valve 4 is closed, the piston 22 cannot move towards the cam 27.

The flywheel assembly 7 is designed such that a torque produced by deceleration will only operate the deceleration sensing means, in a manner to be described, at decelerations in excess of a predetermined threshold value, for example 1 g.

When the pressure from the master cylinder 16 applied to the brake 67 is sufficient to cause the wheel to decelerate by an amount to cause a skid, the braked wheel will have almost certainly decelerated at greater than the threshold value. The flywheel 50, which continues to rotate due to its inertia, then freewheels on the one-way drive 55 and the flywheel 50 moves angularly through a greater distance than the pressure plate 54. This causes the balls 56 to tend to ride out of their recesses, causing the pressure plate 54 and the collar 52 to move axially on the splines 53 away from the flywheel 50 and pivot the lever 62 against the loading in the spring 65.

The closing force applied to the dump valve 4 is thereby relieved so that the valve member 40 can move away from its seating 36 to vent the bore of the body 33 to reservoir through the ports 43. The valve member 34 is unbalanced and retracts from the bore 19 to exhaust the chamber 18 to reservoir through the ports 44. The working chamber 30 of the pump 3 is also similarly vented through the one-way valve 19.

Reduction in pressure in the chamber 18 causes the piston 10 to be unbalanced so that it moves away from the seating 14 to permit the ball 13 to engage with the seating 14. This cuts off the supply from the master cylinder 16 to the brake 67. Further movement of the piston 10 in the same direction expands the brake volume. This, in turn, reduces the pressure applied to the brake 67.

Reduction in pressure in the working chamber 30 permits the rod 24 to be urged into engagement with the cam 27 by the pressure from the master cylinder 67. This causes reciprocation of the piston 22 in the bore 23 to draw fluid from the reservoir 21 into the working chamber 30 through the one-way valve 20 when the piston 22 is urged away from the seal 25, and to force fluid from the working chamber 30 and into the chamber 18 through the one-way valve 19, upon movement of the piston 22 in the opposite direction. Whilst the dump valve 4 remains open the chamber 18 continues to be vented to the reservoir 21.

When the speed of the wheel has recovered sufficiently for the deceleration of the flywheel 50 relative to the shaft 5 to drop below the threshold value, then the lever 62 pivots to cause the valve member 40 to re-engage its seating 36. This, in turn, causes the valve member 34 to return to its initial latched position due to the force in the spring 37. This closure of the dump valve 4 isolates the expansion chamber 18 from the reservoir 21 so that the action of the pump 3 raises the pressure in the chamber 18. This pressure acts, initially, to return the piston 10 towards its operative position to raise the pressure in the brake-line, and subsequently, if no further skid develops, to urge the ball 13 away from its seating 14. The provision of the restrictor 32 ensures that the brake re-application occurs gradually. In this condition no further fluid can be discharged from the pump 3 since the fluid in the chamber 18, the inclined drilling 29, and the chamber 30 is substantially incompressible. Thus the piston 20 will be held disabled at top-dead-centre at the end of the immediately following suction stroke.

When the over-running flywheel 50 has moved through an angular distance sufficient to actuate the ball mechanism 56, it continues to overrun by slipping the clutch 59, which is designed to decelerate the flywheel 50 at a level slightly higher than that of the threshold value, say approximately 1.2 g. A figure equal to the threshold value would be ideal but allowance has to be made for variations in the characteristics of the clutch 59. Hence the flywheel 50 is decelerated at a higher rate than the highest practical vehicle deceleration.

Figure 3:
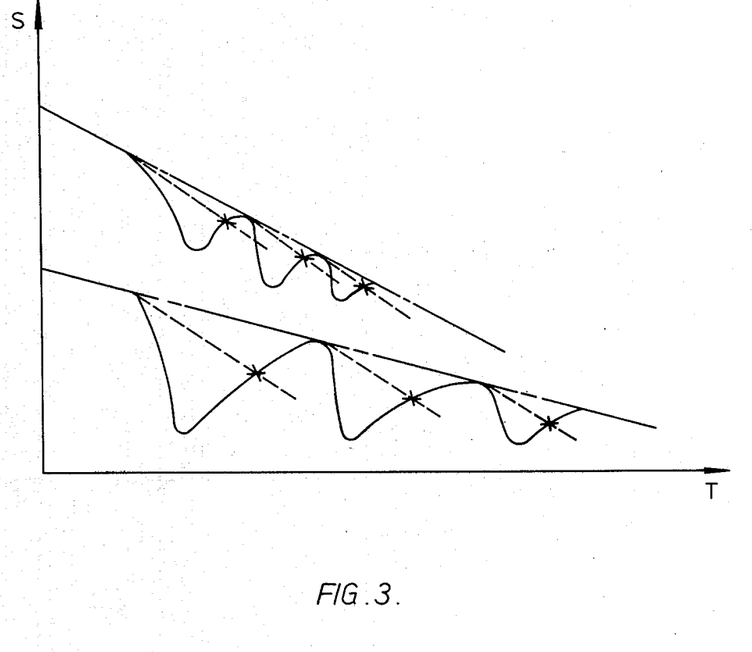
FIG. 3 is a graph of speed (S) against time (T)

In the graph of speed (S): time (T) in FIG. 3, the vehicle is indicated by broken lines (– – –), the flywheel 50 by dotted lines (-----), the wheel by continuous lines (—), and each re-application point by an "x". The upper figure shows the characteristics for a surface of high coefficient of friction (high μ), and lower figure for a surface at low coefficient of friction (low μ). Specifically the graph shows that a time delay is necessary between the brake re-apply signal occurring, and full brake re-application becoming effective. This time needs to be short for high μ surface conditions where the wheel re-acceleration is high; and longer for low μ conditions where the wheel re-acceleration is much slower.

Conveniently, the amount of brake line pressure reduction (and therefore the volume of fluid dumped from the chamber 18) required to correct a skid on a high μ surface is much less than that required for a low μ surface so that the size of the restrictor 32 can be chosen to provide the appropriate recharge time for the chamber 18.

In the embodiment described above, the maximum output of the pump 3, which governs the system response time, is rendered independent of wheel speed by the restrictor 32. Hence excessive pumping of the brake fluid is avoided.

Leakage through the one-way valve 20 could result in an inability to hold the vehicle stationary, for example, on a hill, due to the expander piston 10 retreating and allowing the ball 13 to engage with its seating. This is prevented by the reduced diameter extension 35 which latches the expander piston 10 in its lowest position, as described above.

The system becomes inoperative at speeds below that at which the flywheel 50 no longer has sufficient energy to actuate fully the ball and ramp mechanism 56.

When the pump piston 22 operates, the master cylinder 16 is cycled lightly. This gives the rider, in the case of a motor cycle, or the driver, in the case of a motor car, a warning that the road conditions were adverse since the skid had been arrested. To avoid such pulsations, the inlet 28 could be connected to the outlet port 17.

A further modification is available by making the effective strength of the spring 65 responsive to the average pressure in the brake line. This, in turn, reflects the optimum braking pressure for the particular road surface. The spring 65 could then be used in conjunction with the spring 57 to tailor the threshold and the over-run deceleration of the flywheel 50 to the probable vehicle deceleration.

Figure 4:
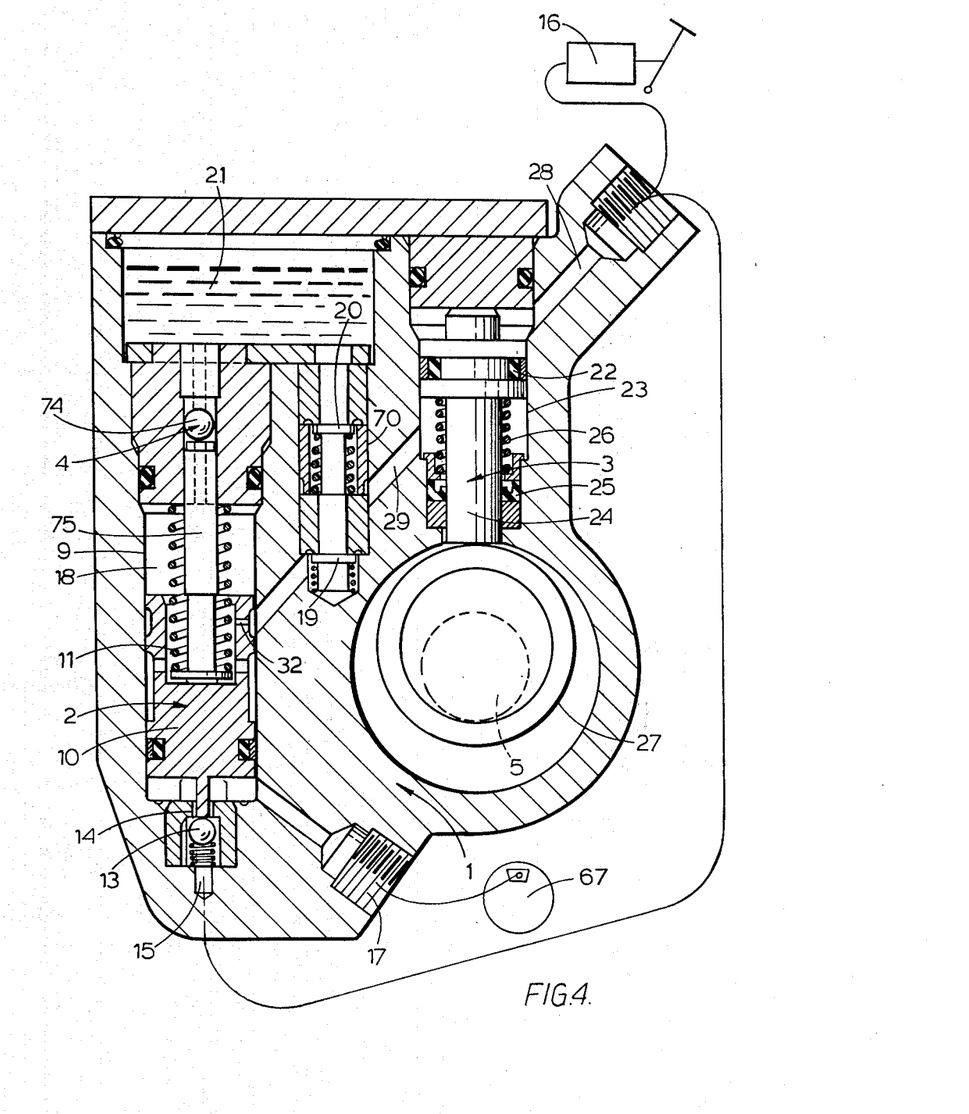
FIG. 4 is a section similar to FIG. 1 through a modified assembly.
Figure 5:
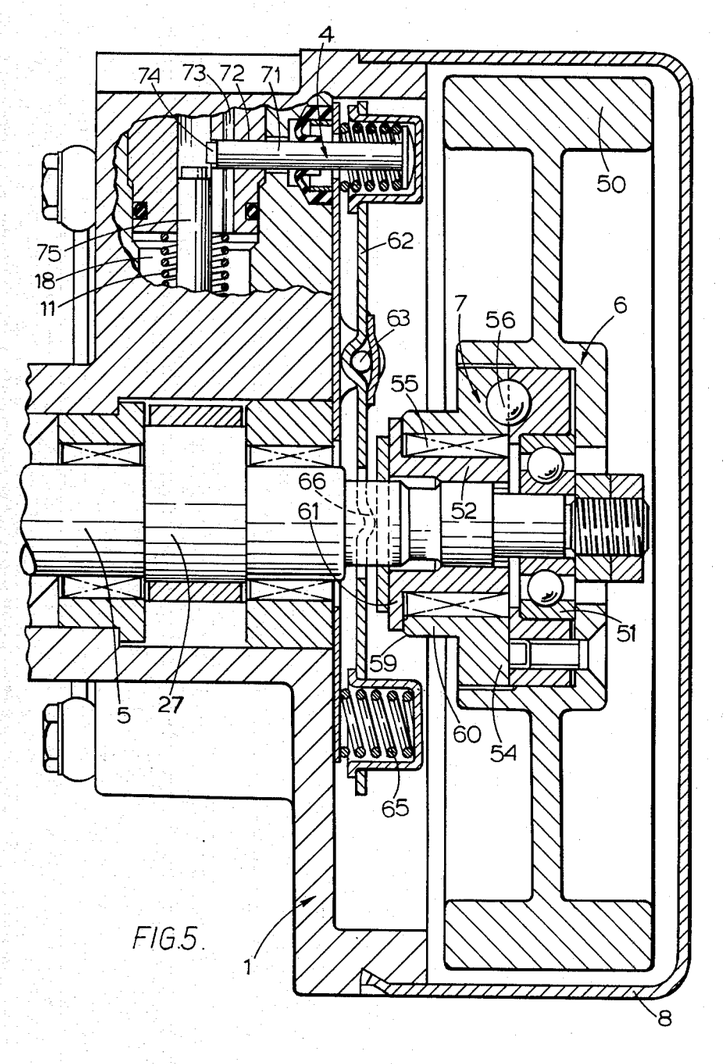
FIG. 5 is a longitudinal section similar to FIG. 2 in a plane normal to the plane of FIG. 4.

In the embodiment of FIGS. 4 and 5 the one-way valves 19 and 20 are housed in a bore 70 which is located between the bores 9 and 23 and traverses the passage 29. The spring 57 is omitted and its function is taken over by the spring 65 which causes the lever 62 to bear continuously against the collar 52 through the contact 66.

The dump valve 4 is of modified construction comprising a single valve member 71 in the form of a headed stem which is guided to slide in a bore 72 in the housing to connect a return passage 73 to the reservoir 21. The free inner end of the stem 71 has a reduced diameter spigot 74 to latch the piston 10 by engagement with a thrust member 75 which acts on the piston 10.

The construction and operation of the embodiment of FIGS. 4 and 5 is otherwise the same as that of FIGS. 1 and 2 and corresponding reference numerals have been applied to corresponding parts.

Figure 6:
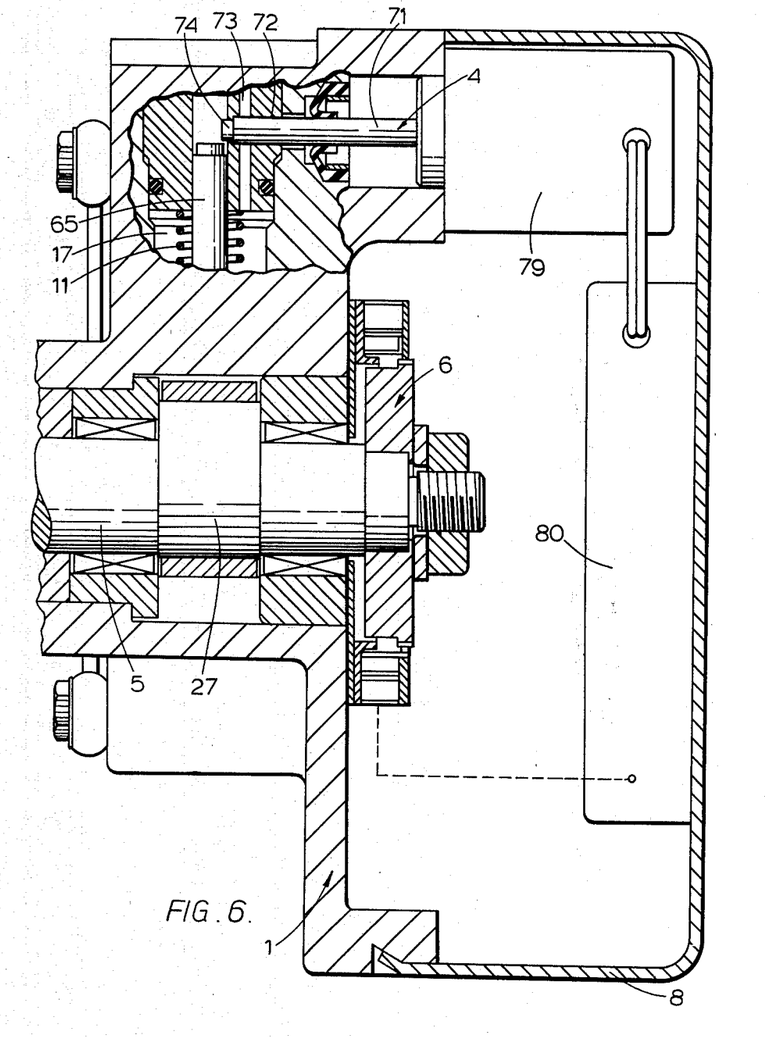
FIG. 6 is a longitudinal section similar to FIG. 5 but showing a modified construction.

In the modification illustrated in FIG. 6, the skid sensing means 6 comprises an electronic wheel speed sensor of known construction which is driven from the end of the shaft 5, and the dump valve 4 is operated by a solenoid 79. A similar electronic wheel speed sensor could replace the flywheel assembly 7 of FIGS. 1 and 2 used with solenoid actuation. In such a modification a lower operating force would be required.

Signals corresponding to the speed of rotation of the wheel are fed into a control module 80 which analyses the signals and, when a skid is detected, generates an electrical current to energise the solenoid and open the dump valve 4. Upon correction of the skid, the dump valve 4 closes so that the brake re-application sequence takes place as described above.

The construction and operation of the modification of FIG. 6 is otherwise the same as that of FIGS. 4 and 5, and corresponding reference numerals have been applied to corresponding parts.

The construction described above can readily be applied to existing motor cycle and motor car braking systems with a minimum of modification.

Figure 7:
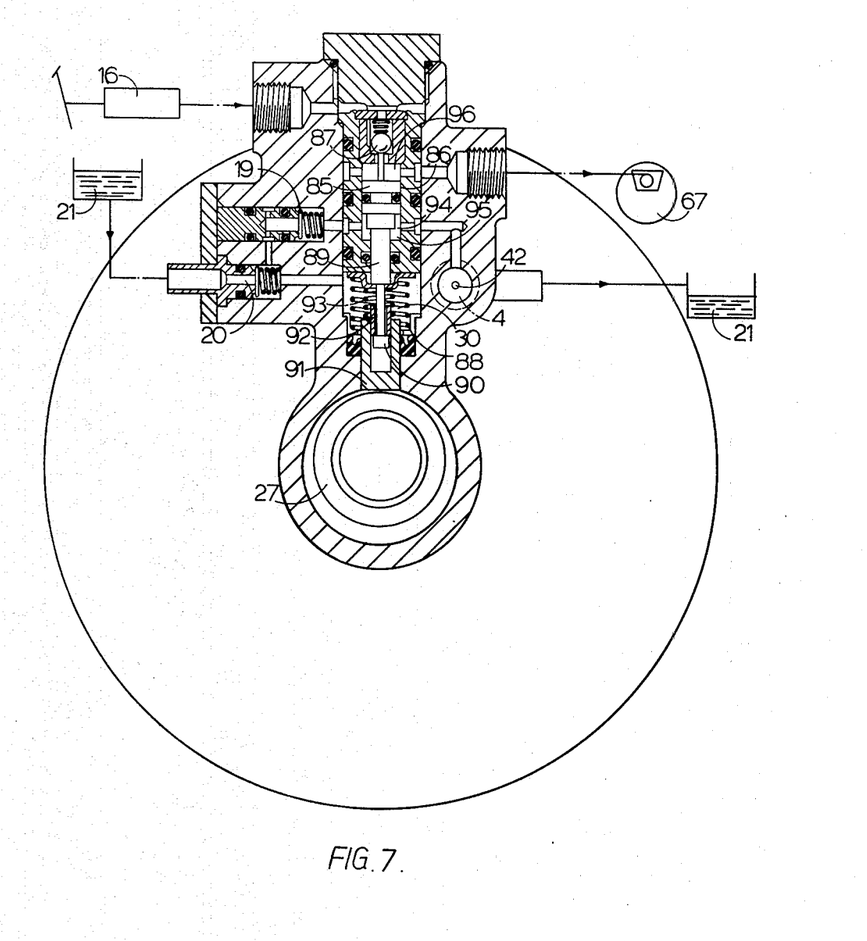
FIG. 7 is a transverse section similar to FIG. 1 of a further combined modulator and skid sensing assembly.
Figure 8:
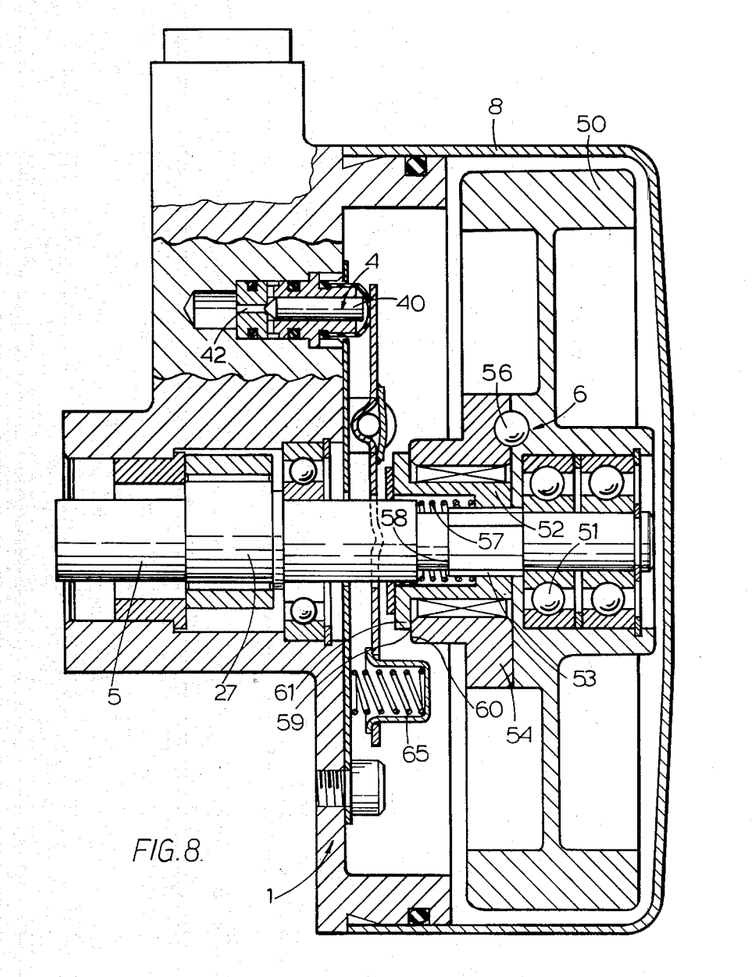
FIG. 8 is a longitudinal section through the assembly in a plane normal to the plane of FIG. 7.

In the construction illustrated in FIGS. 7 and 8 a signal piston 85 works in a bore 86 in the housing 1 to control operation of a ball valve 87 which, in turn, controls communication between the master cylinder 16 and the brakes 67. Normally the piston 85 is biassed by a spring 88 in a direction to hold the ball valve 87 open. The piston 85 carries a piston rod 89 which has an enlarged head 90, and the head 90 is adapted normally to hold a pump plunger 91 away from the eccentric cam 27 by means of a sleeve 92 which is a press fit in a bore in the plunger 91. A spring 93 biasses the plunger 91 towards the cam 27.

The one-way valves 19 and 29 are arranged in interconnected parallel bores in the housing 1.

When the brake 67 is applied the pressure applied to the brake 67 acts against the upper surface of the signal piston 85 which is unable to move because fluid in a chamber 94 between the piston 85 and the rod 89 is trapped between the pressure dump valve 4 and the one-way valve 19.

In the event of a skid the dump valve 4 is opened by the flywheel assembly 7 so that fluid from the chamber 94 can escape to the tank thus allowing the signal piston 85 to retract under the effect of the pressure applied to the brake. The piston 85 moves towards the cam 27 until it abuts against a stop 95 defined by a shoulder in the bore 86 at the lower end of the chamber 94. During this movement the ball valve 87 is permitted to close thus isolating the master cylinder 16 from the brake 67. Further movement of the piston 85 in the same direction and beyond the point at which the valve 67 closes serves to reduce the pressure in the line to the brake 67 by expansion in the effective volume of a chamber 96 above the piston and leading to the brake 67.

As the signal piston 85 moves towards the eccentric cam 27, the pump plunger 91 is allowed to engage the eccentric cam 27 and starts to pump fluid through the valve 20, into the working chamber 30 and thence out through the valve 19 and back to the tank 21 by way of the pressure dump valve 4.

When the skid has been corrected the pressure dump valve 4 closes, and fluid from the working chamber 30 pressurises the chamber 94. This urges the signal piston 85 back towards its original position, thus re-pressurising the brake line by reducing the effective volume of the chamber 96, and subsequently re-opening the ball valve 87.

In the construction described above with reference to FIGS. 7 and 8 of the drawings, the signal piston 85 takes over the function of the piston 10 of the modulator assembly 2 of the previous embodiments and also serves to isolate the master cylinder 16 from the pulsations of the pump 3.

The construction of FIGS. 7 and 8 is otherwise the same as that of FIGS. 1 and 2, and corresponding reference numerals have been applied to corresponding parts.

Figure 9:
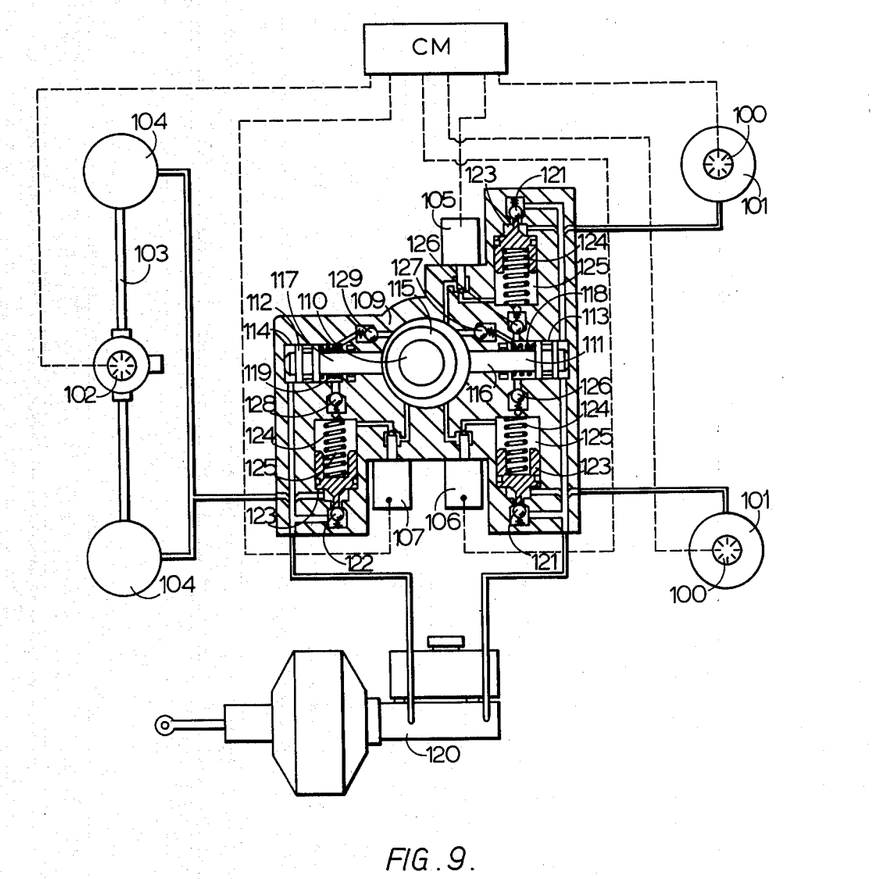
FIG. 9 is a transverse section of yet a further combined modulator and skid sensing assembly.

In the braking system shown in the layout of FIG. 9 speed sensors 100 sense the speed of rotation of each front wheel which is braked by a brake 101, and a single speed sensor 102 senses the speed of rotation of a rear axle 102 for driving wheels which are braked by rear brakes 104.

The signals from the speed sensors 100 and 102 are fed into an electric control module CM which analyses the signal and emits output voltages for operating three solenoid-operated valves 105, 106, 107 when a signal from an equivalent sensor 100, or 102, respectively, indicates that a skid is likely to occur.

The solenoid operated valves 105, 106, 107 are incorporated in, and form part of, a modulator assembly 108. The modulator assembly 108 comprises a housing 109 through which projects a transverse shaft 110 which can be rotated by a drive from the rear axle 103. A pair of opposed pump plungers 111 and 112 work in opposed bores 113 and 114 in the housing 109. Each plunger 111, 112 is reciprocated in its bore 113, 114 by means of an eccentric cam 115 on the shaft 110 and with which a piston rod 116, 117 working through a portion of the bore 113, 114 which is of smaller diameter is engageable. A working chamber 118, 114 respectively is defined in each bore 113, 114, between the plunger 111, 112 and the rod 116, 117.

Hydraulic pressure from separate pressure spaces of a booster-operated tandem master cylinder assembly 102 is adapted to control operation of the brakes 101 and 104. Specifically pressure from one pressure space is supplied to each front wheel brake 101 through a one-way ball valve 121, and that pressure also acts on the end of the plunger 111 which is remote from the cam 115. Similarly pressure from the other pressure space is supplied to both rear wheel brakes 104 through a one-way brake valve 122, and that pressure also acts on the end of the plunger 112 which is remote from the cam 115.

The operation of each one-way valve 121, 122 is controlled by a modulator piston 123 which is normally urged by a spring 124 in a direction to hold a respective valve open. An expansion chamber 125 is defined in a bore in which each piston 123 works on the side of the piston 123 remote from the valve 121, 122 respectively.

The working chamber 118 is connected to each expansion chamber 125 of the valves 121 through a one-way valve 126, and a one-way valve 127 permits flow from a reservoir for fluid into the working chamber 118.

The working chamber 119 is connected to the expansion chamber 125 of the valve 122 through a one-way valve 128, and a one-way valve 129 permits flow from the reservoir for fluid into the working chamber 119.

Each solenoid-operated valve 106, 107 controls communication between a respective expansion chamber 125 and the reservoir for fluid.

When the vehicle is in motion the shaft 129 is rotated and the two plungers 111 and 112 are normally spring-loaded away from the eccentric cam 115 so that fluid is not circulated. The pistons 123 are held by the springs 124 against stops so that the valves 121, 122 are held fully open.

When the brakes are applied the plungers 111, 112 are loaded towards the eccentric cam 115 by the fluid applied to the brakes from the master cylinder assembly. However, since fluid is trapped in the chambers 118, 119, the plungers 111, 112 are held firmly out of engagement with the cam 115, against stops in the housing 109.

Should one of the front wheels skid, say the wheel 101 braked by the uppermost brake, the uppermost solenoid valve 105 operates to connect the chamber 125 of the respective modulator piston 123 to the reservoir. This action causes the brake pressure to force the piston 123 away from the valve 121, which allows it to close. Further travel of the piston 123 in the same direction expands the brake volume and relieves the pressure applied to the brake. At the same time the plunger 111 is forced, by the pressure from the master cylinder assembly 120, to follow the eccentric cam 115. The plunger 111 is thereby reciprocated to draw fluid from the reservoir and force it into the chamber 125.

However, the reduction in brake pressure cancels the skid signal so that the solenoid valve 105 closes. The piston 123 is then forced towards the ball valve 121 to re-apply the brake 101.

When the plunger 111 is operated the master cylinder 120 is lightly cycled by the movement of the pump. This gives the driver a warning that the applied pressure is too high for road conditions.

Whilst the front wheel is being corrected, the piston for the other front piston 123 does not move since the one-way valve 126 remains closed. Similarly the plunger 112 for the rear wheel brakes does not move. It follows therefore that each individual brake pressure can be modified without affecting the others.

In a modification the two rear brakes can be controlled separately as the front wheel brakes, but this will necessitate the incorporation of an extra solenoid valve, an additional skid sensor, and a further modulator piston 123.

I claim:

1. An hydraulic anti-skid braking system for a vehicle comprising a vehicle brake, a supply of operating fluid for applying said brake, skid sensing means for producing skid signals, a modulator assembly for modulating said supply of operating fluid to said brake in accordance with said skid signals from said skid sensing means, said modulator assembly incorporating an expansion chamber, an hydraulic pump incorporating a plunger working in a bore having a working chamber which is connected to said expansion chamber, a reservoir for fluid, positive drive means for urging said pump plunger in a first direction to draw fluid from said reservoir into said working chamber during a suction stroke, and pump operating means for applying a force to said plunger to urge said plunger in a second opposite direction to pump fluid from said working chamber into said expansion chamber during a delivery stroke, a dump valve disposed between said expansion chamber and said reservoir for fluid, the dump valve being movable by said skid-sensing means between a normally closed position in which said expansion chamber is pressurised so that said modulator assembly is held in a first position permitting operating fluid to be supplied to said brake and an open position when the skid signal is received whereby the pressure in said expansion chamber is reduced so that the modulator assembly can move into a second position to cut-off communication between said supply and said brake and subsequently reduce the pressure of fluid supplied to said brake, pressurisation of said expansion chamber following correction of a skid with said dump valve in said closed position being limited by said force applied to said plunger by said pump operating means whereafter said plunger is adapted to be held disabled during the subsequent delivery stroke by a volume of fluid trapped between said modulator assembly and said plunger, whereby said pump is operable only to repressurise said expansion chamber following correction of a skid.

2. A system as claimed in claim 1, wherein a single pump plunger is provided for repressurising at least one expansion chamber for a single brake of a vehicle, and a single skid sensing means is provided for said brake.

3. A system as claimed in claim 1, wherein said skid sensing means comprises an electronic speed sensor driven by said wheel and for producing a signal, and a control module is provided into which said signal is fed, said control module in turn providing a current for energising a solenoid for controlling said dump valve.

4. A system as claimed in claim 1, wherein said drive means comprises a cam, and said pump operating means comprises a supply of hydraulic fluid pressure.

5. A system as claimed in claim 4, wherein the said supply of hydraulic fluid pressure comprises said supply of operating fluid for applying said brake.

6. A system as claimed in claim 4, wherein the said supply of hydraulic fluid pressure comprises said supply of operating fluid adapted to be applied to said brake from said modulator assembly.

7. An hydraulic anti-skid braking system for a vehicle comprising a vehicle brake, a supply of operating fluid for applying said brake skid sensing means for producing skid signals, a modulator assembly for modulating said supply of operating fluid to said brake in accordance with said skid signals from said skid sensing means, said modulator assembly incorporating an expansion chamber, an hydraulic pump incorporating a plunger working in a bore having a working chamber which is connected to said expansion chamber, a reservoir for fluid, a dump valve disposed between said expansion chamber and said reservoir for fluid, the dump valve being movable by said skid-sensing means between a normally closed position in which said expansion chamber is pressurised so that said modulator assembly is held in a first position permitting operating fluid to be supplied to said brake and an open position when the skid signal is received whereby the pressure in said expansion chamber is reduced so that the modulator assembly can move into a second position to cutoff communication between said supply and said brake and subsequently reduce the pressure of fluid supplied to said brake, a drive for said pump, and disabler means for preventing said plunger from engaging with said drive until said dump valve has opened.

8. A system as claimed in claim 7, wherein said pump is driven from a wheel through said drive.

9. A system as claimed in claim 8, wherein said skid sensing means is also driven by said wheel.

10. A system as claimed in claim 7, wherein said pump plunger is of differential outline and is adapted to work in a stepped bore with an end of greater area being exposed to said operating fluid and an end of smaller area being engageable with said drive.

11. A system as claimed in claim 10, wherein said disabler means comprises a spring for urging said smaller end of said plunger away from said drive in combination with the pressure in said working chamber which is generated by said operating pressure and which acts over an area of said plunger equal to the difference between opposite ends of said plunger.

12. An hydraulic anti-skid braking system for a vehicle comprising a vehicle brake, a supply of operating fluid for applying said brake, skid sensing means for producing skid signals, a modulator assembly for modulating said supply of operating fluid to said brake in accordance with said skid signals from said skid sensing means, said modulator assembly incorporating an expansion chamber, an hydraulic pump incorporating a plunger working in a bore having a working chamber which is connected to said expansion chamber, a reservoir for fluid, and a dump valve disposed between said expansion chamber and said reservoir for fluid, the dump valve being movable by said skid-sensing means between a normally closed position in which said expansion chamber is pressurised so that said modulator assembly is held in a first position permitting operating fluid to be supplied to said brake and an open position when the skid signal is received whereby the pressure in said expansion chamber is reduced so that the modulator assembly can move into a second position to cutoff communication between said supply and said brake and subsequently reduce the pressure of fluid supplied to said brake, wherein said pump is operable only to repressurise said expansion chamber following correction of a skid, and wherein an expander piston works in a bore and said expansion chamber is defined within said bore by said expander piston, a brake-applying valve being incorporated through which said operating fluid can be supplied to said brake, said expander piston having a first end upon which fluid in said expansion chamber acts to urge said expander piston in a direction to hold said brake-applying valve open, and said expander piston having a second opposite end upon which said operating fluid acts to bias said expander piston in an opposite brake relieving position upon reduction in pressure in said expansion chamber, initially to permit said brake-applying valve to close and thereafter to relieve the pressure of operating fluid applied to said brake.

13. An hydraulic anti-skid braking system as claimed in claim 1 for a vehicle comprising a vehicle brake, a supply of operating fluid for applying said brake, skid sensing means for producing skid signals, a modulator assembly for modulating said supply of operating fluid to said brake in accordance with said skid signals from said skid-sensing means, said modulator assembly incorporating an expansion chamber, an hydraulic pump incorporating a plunger working in a bore having a working chamber which is connected to said expansion chamber, a reservoir for fluid, and a dump valve disposed between said expansion chamber and said reservoir for fluid, the dump valve being movable by said skid-sensing means between a normally closed position in which said expansion chamber is pressurised so that said modulator assembly is held in a first position permitting operating fluid to be supplied to said brake and an open position when the skid signal is received whereby the pressure in said expansion chamber is reduced so that the modulator assembly can move into a second position to cut-off communication between said supply and said brake and subsequently reduce the pressure of fluid supplied to said brake, wherein said pump is operable only to repressurise said expansion chamber following correction of a skid, and wherein said modulator assembly comprises a sensing piston of differential outline having an end of smaller area, a lost-motion connection coupling said end of smaller area to said plunger, said plunger being of constant area throughout its axial length.

14. A system as claimed in claim 13, incorporating disabler means for preventing said plunger from engaging with a drive until said dump valve has opened.

15. A system as claimed in claim 14, wherein said disabler means comprises a spring for urging said sensing piston away from said drive for said pump, and said lost-motion connection is operative to withdraw said plunger from said drive.

16. An hydraulic anti-skid braking system for a vehicle comprising a vehicle brake, a supply of operating fluid for applying said brake, skid sensing means for producing skid signals, a modulator assembly for modulating said supply of operating fluid to said brake in accordance with said skid signals from said skid sensing means, said modulator assembly incorporating an expansion chamber, an hydraulic pump incorporating a plunger working in a bore having a working chamber which is connected to said expansion chamber, a reservoir for fluid, and a dump valve disposed between said expansion chamber and said reservoir for fluid, the dump valve being movable by said skid-sensing means between a normally closed position in which said expansion chamber is pressurised so that said modulator assembly is held in a first position permitting operating fluid to be supplied to said brake and an open position when the skid signal is received whereby the pressure in said expansion chamber is reduced so that the modulator assembly can move into a second position to cut-off communication between said supply and said brake and subsequently reduce the pressure of fluid supplied to said brake, wherein said pump is operable only to repressurise said expansion chamber following correction of a skid, and wherein at least two pump plungers are provided, and said drive is common to each said plunger being adapted to repressurise at least one expansion chamber of an individual brake of a vehicle, and a separate skid sensing means is provided for each respective individual said brake.

17. An hydraulic anti-skid braking system for a vehicle comprising a vehicle brake, a supply of operating fluid for applying said brake, skid sensing means for producing skid signals, a modulator assembly for modulating said supply of operating fluid to said brake in accordance with said skid signals from said skid sensing means, said modulator assembly incorporating an expansion chamber, an hydraulic pump incorporating a plunger working in a bore having a working chamber which is connected to said expansion chamber, a reservoir for fluid, and a dump valve disposed between said expansion chamber and said reservoir for fluid, the dump valve being movable by said skid-sensing means between a normally closed position in which said expansion chamber is pressurised so that said modulator assembly is held in a first position permitting operating fluid to be supplied to said brake and an open position when the skid signal is received whereby the pressure in said expansion chamber is reduced so that the modulator assembly can move into a second position to cut-off communication between said supply and said brake and subsequently reduce the pressure of fluid supplied to said brake, wherein said pump is operable only to repressurise said expansion chamber following correction of a skid, and wherein said skid sensing means comprises a flywheel mechanism driven from a wheel and incorporating a lever for operating said dump valve, and a spring is provided for urging said lever in a direction to close said dump valve.

18. A system as claimed in claim 17, wherein the effective strength of said spring is responsive to the average pressure in the brake line.

19. An hydraulic anti-skid braking system for a vehicle comprising a vehicle brake for braking a wheel of a vehicle, an operator-operable means for producing a supply of operating fluid, a modulator assembly for modulating said supply of operating fluid to produce a supply of brake-applying fluid under pressure to apply said brake, said modulator assembly having an inlet and an outlet, an hydraulic pump for producing pressurised fluid to control re-application of said brake, said pump having pressure generating means movable in a first direction to generate said pressurised fluid, means for controlling said brake-applying fluid under pressure in accordance with the dynamic behaviour of said braked wheel, a first connection between said operator-operable means and said inlet, a second connection between said outlet and said brake, connection means for subjecting said pump to pressure fluid from one of said supplies to drive said pressure generating means in said first direction to generate said pressurised fluid.

20. A system as claimed in claim 19, wherein said supply of operating fluid is supplied to said pump by said connection means.

21. A system as claimed in claim 19, wherein said pressure generating means comprises a plunger working in a bore, said plunger being movable in said first direction during a delivery stroke and in a second opposite direction during an induction stroke, a drive being provided for urging said plunger in said opposite direction.

22. A system as claimed in claim 19, wherein said means for controlling said brake-applying fluid under pressure comprises skid sensing means responsive to deceleration of said braked wheel for producing a skid signal, means defining an expander chamber for accommodating a volume of support fluid for determining said operative position of said modulator assembly, a reservoir for fluid, and a valve responsive to a skid signal from said skid sensing means for controlling communication between expander chamber and said reservoir.

23. An hydraulic anti-skid system for a vehicle comprising a vehicle brake for braking a wheel of a vehicle, an operator-operable means for producing a supply of operating fluid, a modulator assembly for modulating said supply of operating fluid to produce a supply of brake-applying fluid to apply said brake, said modulator assembly having an inlet and an outlet, an hydraulic pump for producing a control pressure to determine an operative position of said modulator assembly consistent with the dynamic behaviour of said wheel and in which said modulator assembly is adapted to be held, said pump having pressure generating means movable in a first direction to generate said control pressure, means for controlling said control pressure in accordance with the dynamic behaviour of said braked wheel, a first connection between said operator-operable means and said inlet, a second connection between said outlet and said brake, connection means for subjecting said pump to pressure fluid from one of said supplies to drive said pressure generating means in said first direction to generate said control pressure for said modulator assembly.

24. An hydraulic anti-skid braking system for a vehicle comprising a vehicle brake for braking a wheel of a vehicle, a modulator assembly having an inlet and an outlet, means in said modulator assembly defining an expansion chamber, a pump for providing a control pressure for application to said expansion chamber, said control pressure determining an operative brake-pressure modulating position consistent with the speed of rotation of said wheel in which said modulator assembly is adapted to be held, an operator-operable means for providing a supply of operating fluid for applying said brake and for controlling operation of said pump, a first connection between said operator-operable means and said inlet, a second connection between said outlet and said brake, a third connection between said operator-operable means and said pump, and means for controlling said control pressure in said expansion chamber in accordance with the rate of deceleration of said braked wheel.

* * * * *